US012297674B2

(12) United States Patent
Hunt

(10) Patent No.: US 12,297,674 B2
(45) Date of Patent: May 13, 2025

(54) MOTOR VEHICLE LATCH, IN PARTICULAR A MOTOR VEHICLE DOOR LATCH

(71) Applicant: Kiekert AG, Heiligenhaus (DE)

(72) Inventor: Robert J. Hunt, Davisburg, MI (US)

(73) Assignee: Kiekert AG, Heiligenhaus (DE)

( * ) Notice: Subject to any disclaimer, the term of this patent is extended or adjusted under 35 U.S.C. 154(b) by 365 days.

(21) Appl. No.: 17/863,693

(22) Filed: Jul. 13, 2022

(65) Prior Publication Data

US 2024/0018807 A1 Jan. 18, 2024

(51) Int. Cl.
*E05B 85/02* (2014.01)
*E05B 77/34* (2014.01)
*E05B 81/06* (2014.01)

(52) U.S. Cl.
CPC .............. *E05B 85/02* (2013.01); *E05B 77/34* (2013.01); *E05B 81/06* (2013.01)

(58) Field of Classification Search
CPC E05B 85/02; E05B 77/34; E05B 81/06; F16J 15/022; F16J 15/02; F16J 15/061
USPC .......................................................... 292/201
See application file for complete search history.

(56) References Cited

U.S. PATENT DOCUMENTS 5,529,355 A 6/1996 Fukumoto
10,704,691 B2 * 7/2020 Estrada .................. E05B 85/02
2006/0186674 A1 * 8/2006 Suzumura ............... E05B 77/34 292/216
2010/0072761 A1 * 3/2010 Tomaszewski ......... E05B 81/14 292/216
2017/0138095 A1 * 5/2017 Inan .................... E05B 15/1635
2017/0245378 A1 * 8/2017 Taurasi ................ H05K 5/0004
2018/0245379 A1 * 8/2018 Taurasi .................. H05K 5/069
2020/0165843 A1 * 5/2020 Michetti ................ E05B 77/34
2020/0224464 A1 * 7/2020 Cumbo ................... E05B 81/16
2021/0148143 A1 * 5/2021 Ney ........................ E05B 81/76
2024/0287835 A1 * 8/2024 Schiffer .................. E05B 81/06

FOREIGN PATENT DOCUMENTS

DE 3934982 A1 * 5/1990 ............ E05B 65/12
DE 202008004332 U1 8/2009
DE 102015108733 A1 12/2016
DE 102016109245 A1 11/2017
DE 102021101502 A1 * 7/2022 ............ E05B 77/34
WO WO-2009121327 A1 * 10/2009 ............ E05B 77/34
WO WO-2012159595 A2 * 11/2012 ............ B60K 15/05
WO 2023001334 A1 1/2023
WO 2023061535 A1 4/2023

* cited by examiner

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A motor vehicle latch, in particular a motor vehicle door latch, which is equipped with a latch case and a latch cover as substantial components of a latch housing. The latch case and the latch cover can be connected to one another. In addition, the latch case is equipped with a raised edge at least on part of the circumference. According to the invention, the latch cover overlaps the raised edge with an overhang flange when installed on the latch case.

16 Claims, 6 Drawing Sheets

MOTOR VEHICLE LATCH, IN PARTICULAR A MOTOR VEHICLE DOOR LATCH

FIELD OF DISCLOSURE

The invention relates to a motor vehicle latch, in particular a motor vehicle door latch, having a latch case and a latch cover as substantial components of a latch housing, the latch case and the latch cover being able to be connected to one another, and the latch case being equipped with a raised edge at least on part of the circumference.

BACKGROUND OF DISCLOSURE

The latch case is usually designed to be metallic and is advantageously made of steel or high-strength steel. This is necessary because a locking mechanism consisting of a catch and pawl is typically mounted in or on the latch case and, in particular, in the event of a crash, it has to absorb tearing forces acting thereon. In contrast, the latch cover is usually a plastic injection molded part. The latch cover can be designed in one or more parts. For the connection between the latch case and the latch cover, typical catch connections, plug-in connections, but also screw connections, etc. can be used.

Such motor vehicle latches and in particular motor vehicle door latches are already described in the prior art according to US 2018/0245379 A1 and US 2017/0245378 A1. In this case, it is in particular important to design an electrical assembly or an electrical module to be particularly watertight and media-tight. For this purpose, a circuit board is accommodated in a liquid-tight open housing. With the help of the circuit board or what is known as an electrical component carrier, individual electrical/electronic components can be contacted and placed.

A liquid and media-tight design of a latch housing in a motor vehicle latch and in particular motor vehicle door latch is of particular importance if the motor vehicle in question is to be moved, for example, in a dusty or particularly damp environment. Such requirements for a particularly tight design arise all the more in the event that the motor vehicle in question is to be designed to be capable of fording or even buoyancy. In this case, it is to be expected that the relevant motor vehicle latch and in particular motor vehicle door latch will even be immersed in water or will be located in an area below a water line. Accordingly, solutions are sought at this point that allow perfect watertightness or reliable venting and the removal of water. So far, there are no convincing and comprehensive solutions for this.

This is because in the prior art already mentioned and referred to, the electrical module or an electrical assembly is primarily equipped with appropriate sealing measures. Nevertheless, in such a case, water can continue to penetrate through the latch case. In principle, this is also possible with the known electrical module. The invention as a whole seeks to remedy this.

SUMMARY OF DISCLOSURE

The invention is based on the technical problem of further developing such a motor vehicle latch and in particular a motor vehicle door latch in such a way that tightness is improved and at the same time the possibility of perfect venting if water has entered is made available and exists.

To solve this technical problem, in a generic motor vehicle latch and, in particular, a motor vehicle door latch, the invention proposes that, when installed on the latch case, the latch cover engages over the raised edge of the latch case with an overhang flange.

In the context of the invention, the latch case is therefore initially equipped with the raised edge, at least on part of the circumference. In this way, a total of two advantages are achieved. First of all, the edge on the latch case, which edge is raised at least on part of the circumference, ensures that the latch case is stiffened overall and twisting of the latch case due to forces acting thereon is reduced. The latch case functions as before and unchanged, as it were, as a bearing plate for the locking mechanism mounted therein or thereon, which substantially consists of a catch and a pawl.

In addition to such a mechanical reinforcement, the raised edge also ensures that the seal between the latch case and the latch cover is improved according to the invention. Because, with the help of the raised edge in conjunction with the overhang flange, a kind of surge protection is provided that prevents water that hits the latch housing or latch case from penetrating into the interior of said latch housing or lock case.

In order to further improve the sealing effect in this region, i.e., between the latch case and the latch cover, a seal is also advantageously provided that closes a slotted channel between the overhang flange and the raised edge. That is to say, the raised edge and also the overhang flange as a whole and taken together first of all function as surge protection, which is in particular important if, for example, an associated motor vehicle is to travel through water or ford. In any case, both measures taken together, i.e., the raised edge on the latch case on the one hand and the overhang flange on the latch cover engaging over the edge on the other hand, ensure that water is not or only to a limited extent able to penetrate into the connection region between the latch case and the latch cover. At this point, a slotted channel is provided between the overhang flange and the edge. In addition and advantageously, said slotted channel is closed with the seal.

The seal can be designed in an F-shaped cross section on the edge side. This makes it possible for the seal, which has an F-shaped cross section on the edge side, to engage around a fastening web on the latch cover with its two F-legs. As a result, the seal in question can be easily fixed to the latch cover with its two F-legs, namely in that the two F-legs encompass the fastening web accommodated in the middle therebetween. In contrast, the F-web of the seal, which has an F-shaped cross section on the edge side, ensures that the slotted channel in question is closed.

This seals the region between the latch case and the latch cover perfectly. However, it must be taken into account here that liquid or dust, for example, can still penetrate via the latch case and an inlet mouth implemented at this point. In order to also create a barrier at this point and to limit the ingress of water to a minimum, the invention also provides that the seal closing the edge region between the latch case and latch cover is designed overall as a surface seal. With the help of the surface seal, a locking mechanism mounted in the latch case can be largely sealed toward the latch cover.

The seal is largely designed to be continuous and closed, with the exception of any openings through which, for example, an extension on a pawl is accessible. For example, the locking mechanism can be opened electrically via said extension, such that the extension in question reaches through and also must reach through the surface seal. Nevertheless, a predominant sealing of the latch case and the locking mechanism is made possible in this way. This also applies to the region of the inlet mouth, which is covered and sealed using the surface seal. As a result, moisture can ultimately only penetrate the latch cover via the inevitable opening for the extension on the pawl. Because ventilation holes are often provided at this point in the surface seal or in the edge region thereof, any water that has penetrated can also easily leave the latch housing again, for example after fording.

According to a further advantageous embodiment, the design is such that the seal or surface seal, the latch case and the locking mechanism together define a mechanical module. This mechanical module can be combined with an electrical module associated with the latch cover to form the latch housing that encloses both modules. That is to say, both the mechanical module and the electrical module are self-contained, independent assemblies that function in principle per se and can be coupled to one another in the manner of a plug-in construction kit. The mechanical module comprises the latch case, while the electrical module is equipped with the latch cover. As soon as the mechanical module and the electrical module are connected to one another, for example by means of a plug-in or catch connection, such a catch or plug-in connection is observed in the same way between the latch case on the one hand and the latch cover on the other.

The electrical module typically has an electrical component carrier and at least one drive unit. In the context of the invention, an electrical component carrier is generally a circuit board made of plastic, on or in which conductor tracks are introduced. Typically, an electrical component carrier is defined and produced by overmolding a punched grid made of metal as the associated conductor tracks.

The drive unit can now, for its part, be fixed to the electrical component carrier. In addition, the invention provides that the drive unit is covered with a drive housing. For its part, the drive unit can be equipped with an electric motor, optionally a downstream gear mechanism, a driven pulley and optionally an actuating cam in detail. The electrical component carrier and the drive housing are connected to one another in a sealing manner via at least one circumferential plug-in channel. In principle, two plug-in channels running parallel to one another can also be realized at this point. In addition, it is within the scope of the invention to equip the plug-in channel in question with a ventilation hole. This makes it possible for moisture or water that has penetrated into the interior of the latch cover to be able to leave the latch housing via said ventilation hole.

As already explained, the drive unit has the electric motor, optionally the downstream gear mechanism, the driven pulley and the actuating cam. To be able to act on the actuating cam, which is usually arranged outside of the drive housing, a shaft of the drive unit is generally guided to the outside through a sealed rotary passage in the drive housing. In this way, the actuating cam can, for example, work directly or indirectly on the extension that penetrates the surface seal on the pawl and in this way lift the pawl away from its latching engagement with the catch. This corresponds to an electrical opening of the locking mechanism mounted in the latch case.

In order to implement a particularly tight rotary passage between the shaft and the drive housing, the sealed rotary passage is equipped according to the invention and advantageously with a ring seal that is X-shaped in cross section. This X-shaped ring seal can be an O-ring seal.

Finally, it has proven to be particularly advantageous if the drive housing and/or the electrical component carrier is equipped with at least one discharge opening. Any water that has penetrated into the interior can leave the interior of the drive housing again via said discharge opening. In addition, the procedure is usually such that a trap for water inside the drive housing and possibly an air cushion in the interior are also optionally implemented. The air cushion in the interior of the drive housing ensures that, for example, when the associated motor vehicle is fording and the motor vehicle latch is below the waterline, no water can penetrate the drive housing via the discharge opening because at this point the air cushion accommodated inside prevents water from penetrating.

As a result, a motor vehicle latch and in particular a motor vehicle door latch is provided and implemented that is equipped with special measures to provide comprehensive tightness, in particular against water and of course also against dust or other unfavorable environmental influences. This can essentially be traced back to the implementation of the edge on the latch case running around at least on part of the circumference on the one hand and the overhang flange that overlaps the edge on the other hand. This already provides effective surge protection for any penetrating water. A seal that is additionally implemented in the associated slotted channel, which seal is designed with an F-shaped cross section on the edge side, also allows the seal to be installed quickly and easily, and said seal ensures that no water can penetrate into the interior of the latch housing via the slotted channel in question.

In addition, the electrical component carrier or the at least one drive unit arranged thereon additionally and complementarily has a separate drive housing, the drive housing and the electrical component carrier being connected to one another in a sealing manner via a circumferential plug-in channel. This means that an additional seal is made at this point, which prevents any gears or the driven pulley as part of the drive unit from being damaged by penetrating water. Nevertheless, with the help of the drive unit, a rotational movement can be transmitted to the outside of the drive housing because the sealed rotary passage is implemented at this point. For its part, the rotary passage is equipped with a special ring seal having an X-shaped cross section, which ring seal provides the necessary sealing of the rotary passage and thus the shaft to the outside of the drive housing. The substantial advantages can be seen here.

BRIEF DESCRIPTION OF DRAWINGS

The invention is explained in greater detail below with reference to drawings, which show only one exemplary embodiment. In the drawings.

DETAILED DESCRIPTION

Figure 2:
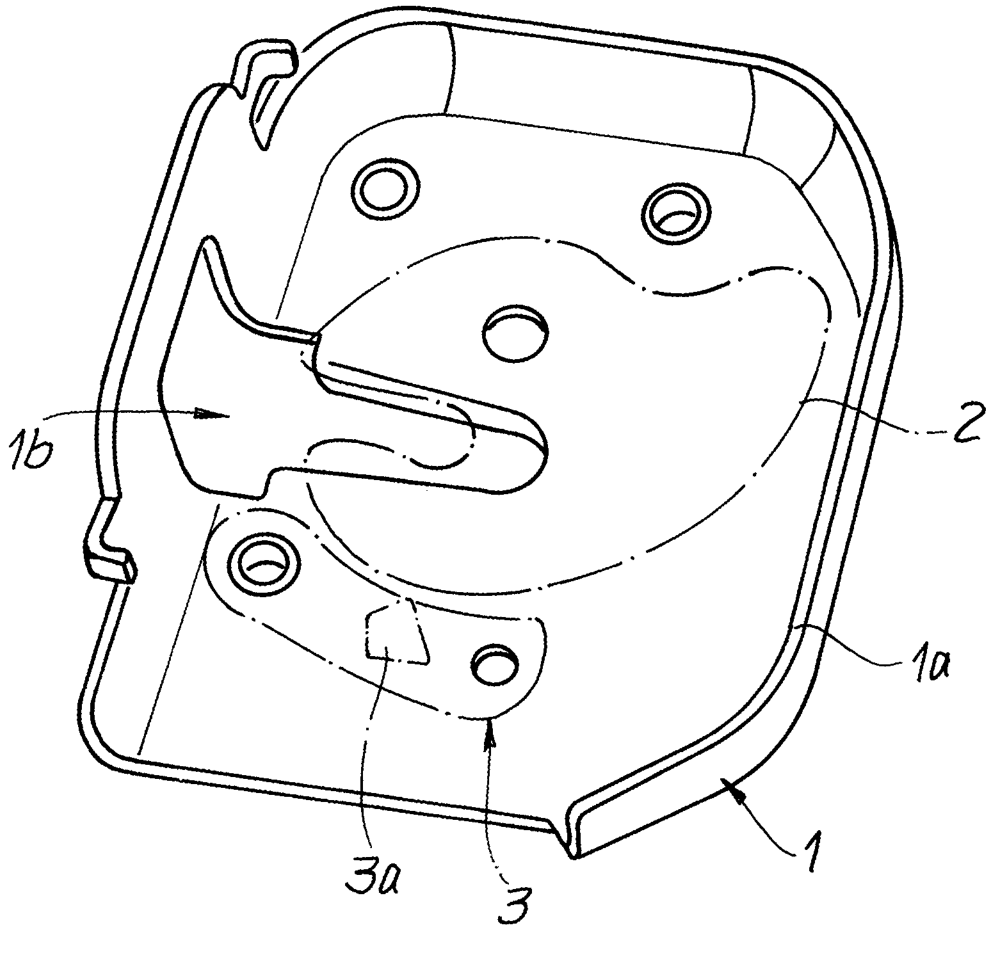
FIG. 2 is a detailed view of the latch case.

The drawings show a motor vehicle latch which, according to the exemplary embodiment, is a motor vehicle door latch. For this purpose, the motor vehicle door latch has a latch case 1 in which a locking mechanism 2, 3 consisting of a catch 2 and pawl 3, which is only indicated in FIG. 2, is rotatably mounted. It can be seen that the latch case 1 is equipped with a raised edge 1*a* on part of the circumference or on part of its circumference. In addition, the latch case 1 is equipped with an inlet mouth 1*b*, via which a locking pin (not shown) can enter the latch case 1 and interact with the locking mechanism 2, 3.

In addition to the latch case 1, a latch cover 4, 5 is then implemented, which, when both taken together, are the substantial components of a latch housing 1; 4, 5. For this purpose, the latch case 1 and the latch cover 4, 5 can be connected to one another. This may be done via a catch connection, a plug-in connection, a screw connection or the like.

According to the embodiment, the latch cover 4, 5 is composed of a latch cover component 4, which is rectangular in cross section, and an electrical component carrier 5 that can be coupled thereto and is explained in more detail below and subsequently. The latch case 1 is combined with the latch cover component 4. The electrical component carrier 5 is then, for its part, connected to said unit 4, 1. In principle, the electrical component carrier 5 and the latch cover component 4 can also first be connected to one another, the latch case 1 then being combined with the latch cover 4, 5 implemented and assembled in this way.

Figure 1:
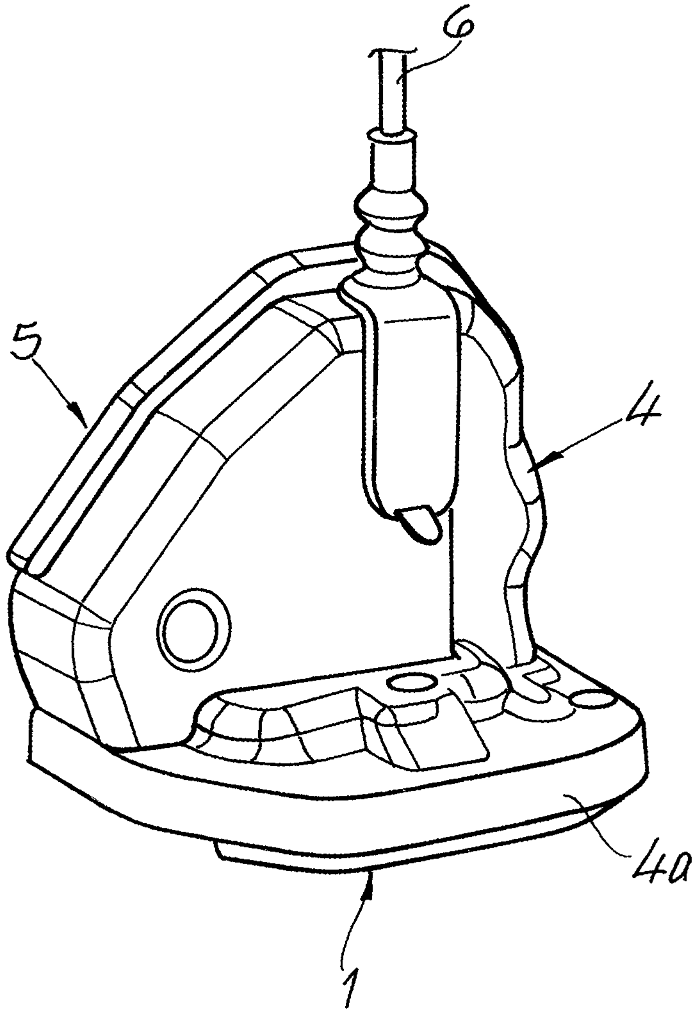
FIG. 1 is an overview of the motor vehicle latch according to the invention in the form of a motor vehicle door latch in the assembled state of the latch case and latch cover as components of the latch housing.
Figure 3:
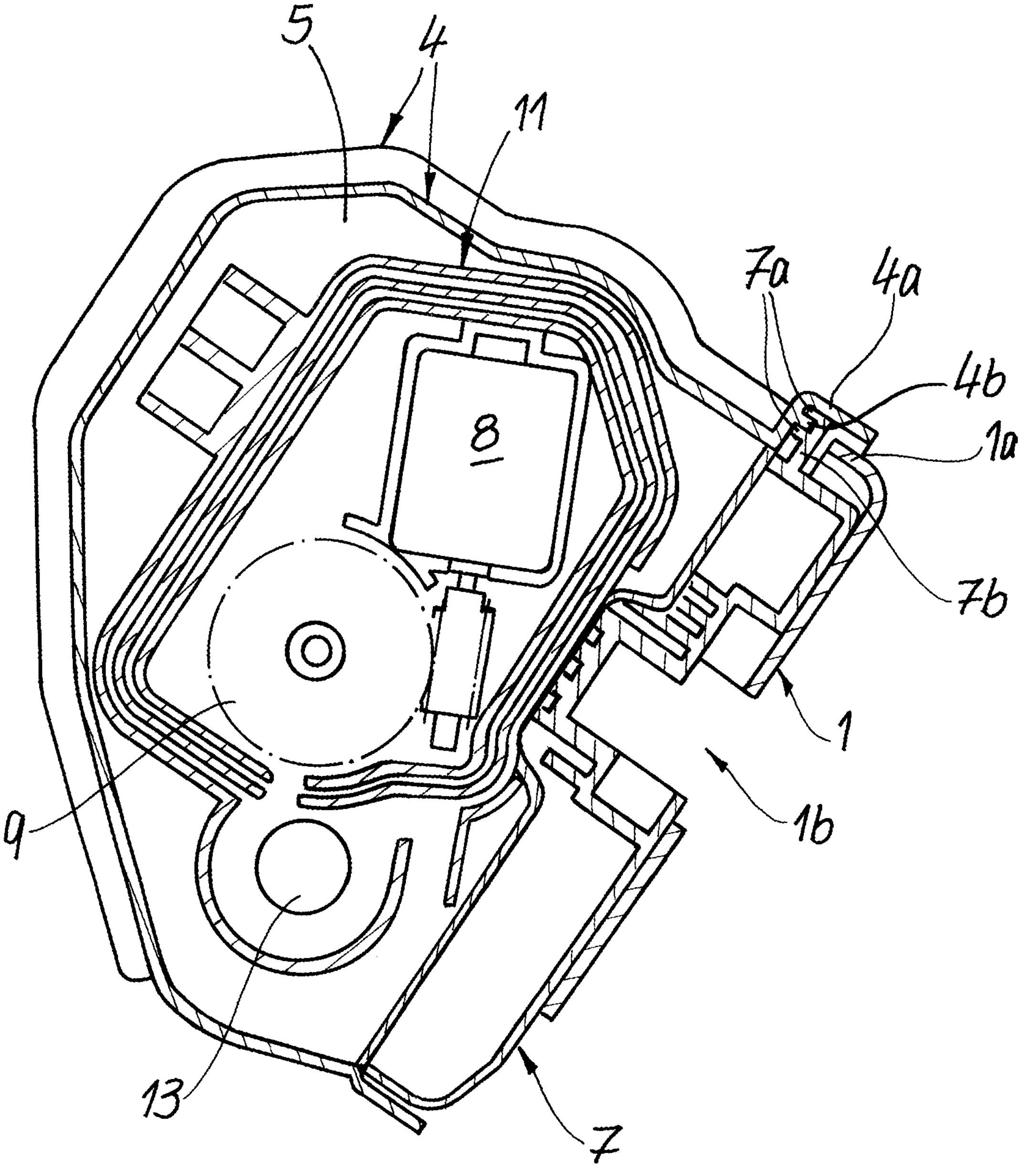
FIG. 3 is a view of the electrical module with the electrical component carrier and removed drive housing.

A comparison of FIGS. 1 to 3 makes it clear that, when installed on the latch case 1, the latch cover 4, 5 overlaps the raised edge 1*a* on the latch case 1 with an overhang flange 4*a*. In this way, the overhang flange 4*a* on the one hand and the edge 1*a* on the other hand function individually or together as splash protection when a motor vehicle equipped with the relevant motor vehicle latch or motor vehicle door latch fords through a river or lake. This is also the reason that a cable or Bowden cable 6 that can be seen in FIG. 1 and is inserted into the latch housing 1; 4, 5 is equipped with a sealing sleeve to seal the insertion region of the Bowden cable 6 relative to the latch housing 1; 4, 5.

FIG. 3 shows a seal 7 that closes a slotted channel between the overhang flange 4*a* on the one hand and the raised edge 1*a* on the other hand. For this purpose, the seal 7 in question has an F-shaped cross section on the edge side. In this way, the seal 7 in question can engage with its two edge-side F-legs 7*a* around a fastening web 4*b* on the latch cover 4, 5 or on the latch cover component 4 thereof between the two F-legs 7*a*. An additionally provided F-web 7*b* of the seal 7 in question now ensures overall that the slotted channel is closed.

Figure 4:
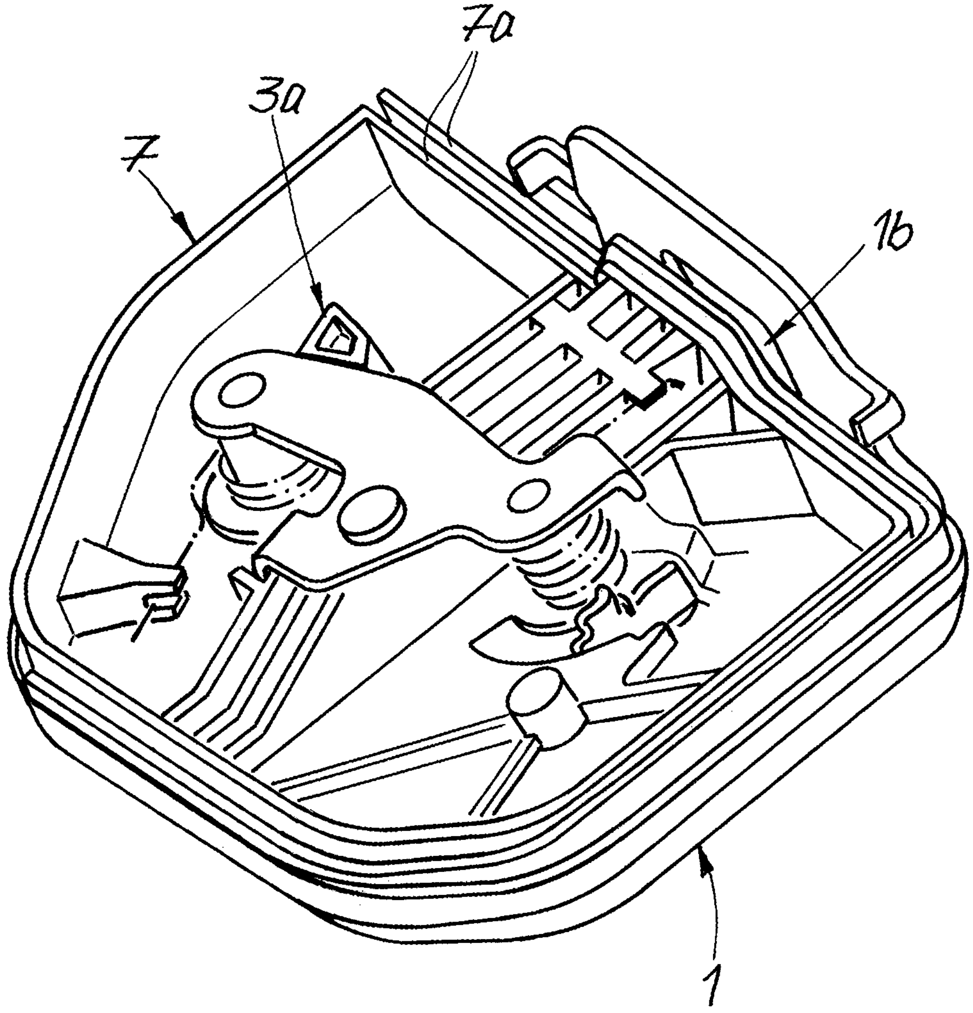
FIG. 4 shows the latch case with the surface seal placed thereon.
Figure 5:
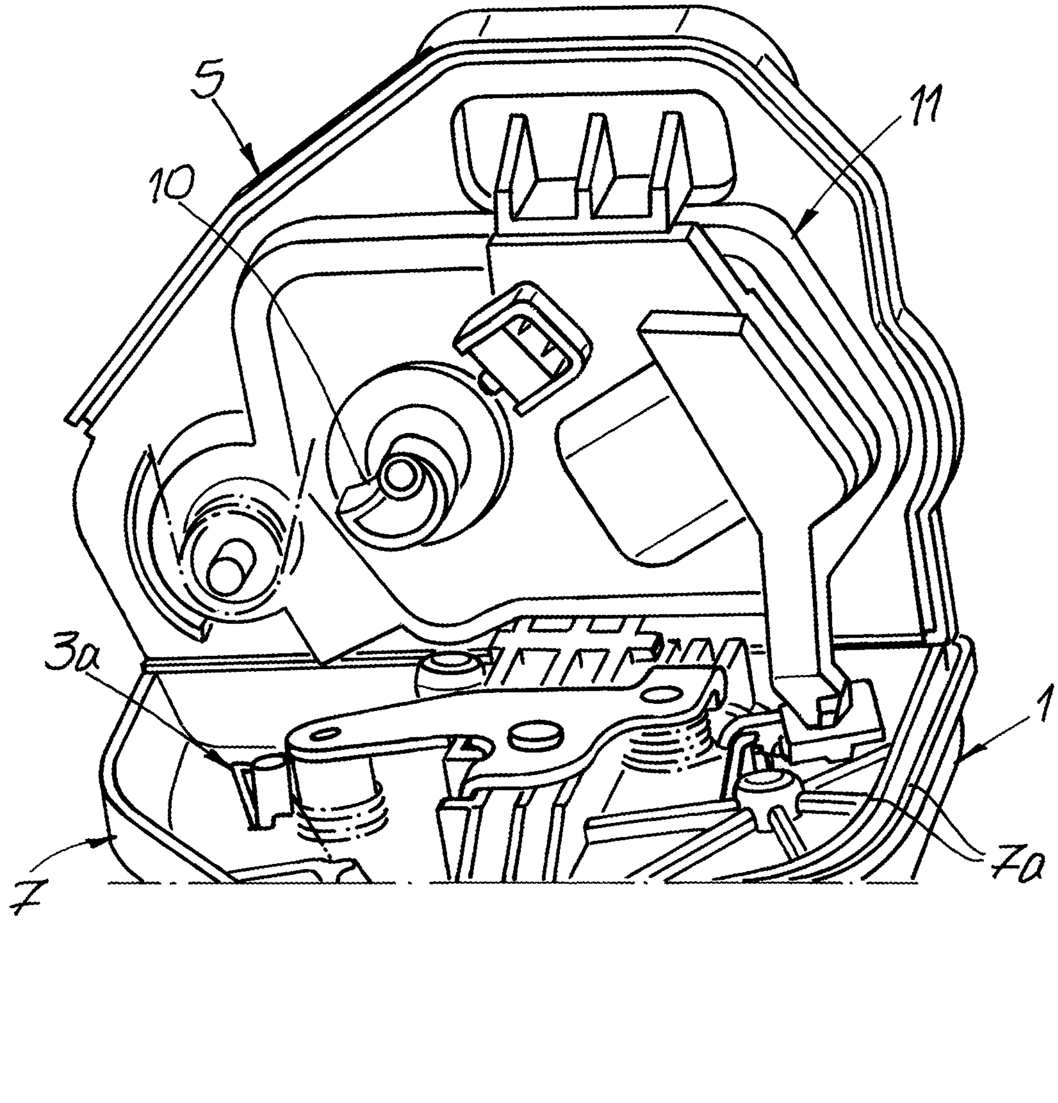
FIG. 5 is a view comparable to that of FIG. 3 with the drive housing installed and FIG. 6 schematically shows a section through the subject matter according to FIGS. 3 and 5.

A comparison of FIGS. 3 and 4 makes it clear that the seal 7 in question is designed overall as a surface seal and that the locking mechanism 2, 3 mounted in the latch case 1 largely seals off the latch cover 4, 5. In fact, the seal 7 or surface seal in question even ensures that the inlet mouth 1*b* in the latch case 1 is sealed off from the latch cover 4, 5.

The seal 7 or surface seal in question largely ensures that the locking mechanism 2, 3 and thus the latch case 1 are sealed off from the latch cover 4, 5. That is to say, it can at this point be seen from FIG. 4 that at least one opening is nevertheless provided in the seal 7 through which an extension 3*a* on the pawl 3 and optionally also another extension on the catch 2 pass. For example, the position of the catch 2 can be queried via the extension on the catch 2. In contrast, the pawl 3 can be lifted from its latching engagement in the closed state of the locking mechanism 2, 3 via the extension 3*a* on the pawl 3. This is ensured by an electromotive drive unit 8, 9, 10, which will be explained in more detail below.

The representation in FIG. 4 makes it clear that the previously described seal 7, the latch case 1 and the locking mechanism 2, 3 mounted in the latch case 1 together define a mechanical module 1, 2, 3, 7. The mechanical module 1, 2, 3, 7 can be combined with an electrical module 4, 5, 8, 9, 10 associated with the latch cover 4, 5 to form the latch housing 1; 4, 5 that encloses both modules 1, 2, 3, 7; 4, 5, 8, 9, 10. This means that latch case 1 is associated with the mechanical module 1, 2, 3, 7. The electrical module 4, 5, 8, 9, 10 comprises the latch cover 4, 5 and the electromotive drive unit 8, 9, 10. As soon as the mechanical module 1, 2, 3, 7 and the electrical module 4, 5, 8, 9, 10 are coupled to one another and combined, the latch case 1 and the latch cover 4, 5, when taken together, also define and describe the latch housing 1, 4, 5 that encloses both modules 1, 2, 3, 7; 4, 5, 8, 9, 10.

The electrical module 4, 5, 8, 9, 10 is equipped with the electrical component carrier 5 already described above. In addition, the at least one drive unit 8, 9, 10 is implemented. The drive unit 8, 9, 10 is, for its part, composed of an electric motor 8, a driven pulley 9 that can be rotated by the electric motor 8, and an actuating cam 10.

The drive unit 8, 9, 10 is fixed overall on the electrical component carrier 5. In addition, a drive housing 11 is implemented, with the help of which the drive unit 8, 9, 10 is covered. That is to say, the drive unit 8, 9, 10 is housed between the electrical component carrier 5 and the drive housing 11, as can best be understood from the sectional view in FIG. 6. This also means that the electrical component carrier 5 and the drive housing 11 are connected to one another in a sealing manner via at least one circumferential plug-in channel 5*a*, 11*a*. The plug-in channel 5*a*, 11*a* is made up of two plug-in pins 5*a* on the electrical component carrier 5 and an associated plug receptacle 11*a* or two such plug receptacles 11*a* on the edge of the drive housing 11 in the embodiment. In this way, the drive unit 8, 9, 10 experiences an additional seal because the drive unit 8, 9, 10 is housed in a sealing manner between the electrical component carrier 5 and the drive housing 11 or by these two housing components.

Figure 6:
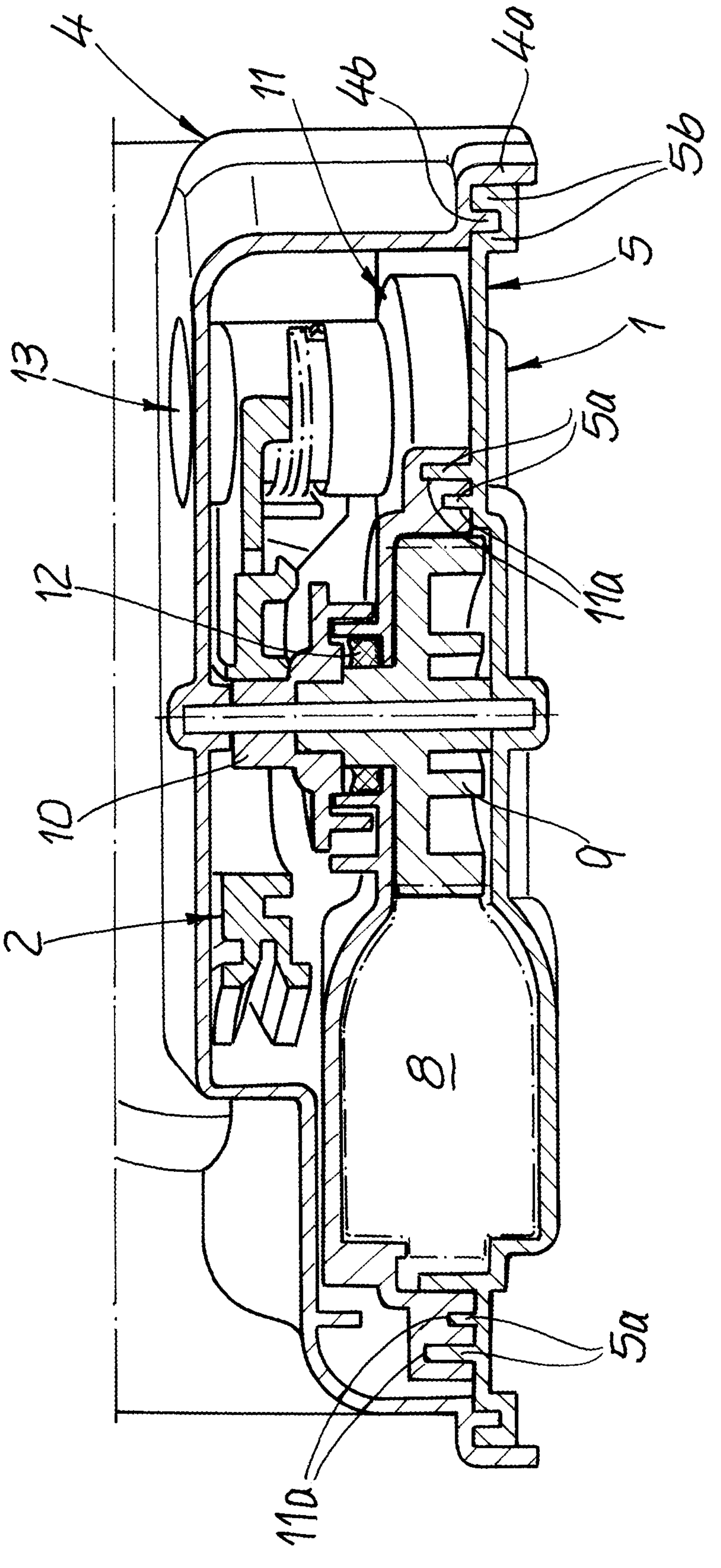

It can also be seen from the sectional view in FIG. 6 that the electrical component carrier 5 is, for its part, coupled to the latch cover 4, 5 on the edge side with the aid of two edge webs 5*b* and additionally a fastening web 4*b* on the latch cover 4, 5 or the latch cover component 4. In this case, too, a plug-in channel 5*b*, 4*b* is implemented. The plug-in channels 5*a*, 11*a* and 5*b*, 4*b* shown can be equipped as required with associated drainage openings that are not shown in detail in order to be able to drain off any water penetrating into the interior of the latch housing 1, 4, 5 to the outside.

The drive unit 8, 9, 10 is designed in such a way that at least one shaft of the drive unit 8, 9, 10 is routed through a sealed rotary passage 12 in the drive housing 11 to the outside of the drive housing 11. As shown in FIG. 6, the rotary passage 12 is equipped with a ring seal 12 that is X-shaped in cross section. The ring seal 12 may be an O-ring seal. In any case, the seal or ring seal 12 in question ensures overall that the shaft emanating from the driven pulley 9 of the electromotive drive unit 8, 9, 10 is sealed off from the drive housing 11. As a result, the actuating cam 10 provided on the output side of the drive unit 8, 9, 10 can be placed outside the drive housing 11 and act on the extension 3*a* on the pawl 3 in such a way that the pawl 3 is lifted from its engagement with the catch 2. In this context, the drive unit 8, 9, 10 consequently acts as an electromotive opening drive. Of course, this only applies as an example. In any case, the X-shaped ring seal 12 ensures particularly low-friction operation.

Finally, based on FIG. 3, it becomes clear that the drive housing 11 removed there and/or the electrical component carrier 5 that can be seen are equipped with at least one additional discharge opening 13. This of course also applies to the latch housing 1, 4, 5 as a whole. Any water that has penetrated into the interior of the drive housing 11 can be discharged back to the outside via said discharge opening 13. In addition, the region of the discharge opening 13 may be designed as a trap for water or optionally also as an air cushion. That is, the air trapped in the interior of the drive housing 11 and between the drive housing 11 and the electrical component carrier 5 or the air volume in the region of the discharge opening 13 may ensure, for example, when a motor vehicle equipped with the relevant motor vehicle door latch is fording, that no water can penetrate into the interior of the drive housing 11 through the discharge opening 13 due to the air cushion, although the moisture contained in said drive housing can be discharged to the outside. The substantial advantages can be seen here.

LIST OF REFERENCE SIGNS mechanical module 1, 2, 3, 7
latch housing 1, 4, 5
latch case 1
edge 1*a*
inlet mouth 1*b*
locking mechanism 2, 3
catch 2
pawl 3
extension 3*a*
latch cover 4, 5
electrical module 4, 5, 8, 9, 10
latch cover component 4
overhang flange 4*a*
fastening web 4*b*
plug-in channel 4*b*, 5*b*
electrical component carrier 5
plug-in pin 5*a*
webs 5*b*
Bowden cable 6
seal 7
F-leg 7*a*
F-web 7*b*
electromotive drive unit 8, 9, 10
electric motor 8
driven pulley 9
actuating cam 10
drive housing 11
plug-in channel 5*a*, 11*a*
rotary passage 12
discharge opening 13

The invention claimed is:

1. A motor vehicle latch comprising:

a latch housing including a latch case and a latch cover, the latch case and the latch cover being connectable to one another to form the latch housing, and the latch case having a raised edge at least on part of a circumference of the latch case and the latch cover having an overhang flange, wherein when the latch cover is installed on the latch case to form the latch housing, the overhang flange of the latch cover overlaps the raised edge of the latch case;

wherein the overhang flange and the raised edge define a slotted channel therebetween, the motor vehicle latch further comprising a seal that closes the slotted channel when the latch cover is installed on the latch case; and wherein the seal has an F-shaped cross section on an edge side of the seal, and the latch cover has a web such that two F-legs of the F-shaped cross section of the seal encompass the web to close the slotted channel.

2. The motor vehicle latch according to claim 1, wherein the seal is designed as a surface seal, and the motor vehicle latch further includes a locking mechanism mounted in the latch case that is sealed toward the latch cover by the seal.

3. The motor vehicle latch according to claim 2, wherein the seal, the latch case and the locking mechanism constitute a mechanical module, and the motor vehicle latch further includes an electrical module coupled to the latch cover, such that when the latch cover is installed on the latch case to form the latch housing, the latch housing encloses the mechanical and electrical modules.

4. The motor vehicle latch according to claim 3, wherein the electrical module has an electrical component carrier and at least one drive unit.

5. The motor vehicle latch according to claim 4, wherein the drive unit is fixed to the electrical component carrier and is additionally covered with a drive housing, the electrical component carrier and the drive housing being connected to one another in a sealing manner via at least one circumferential plug-in channel.

6. The motor vehicle latch according to claim 5, wherein at least one shaft of the drive unit is guided to outside of the drive housing through a sealed rotary passage in the drive housing.

7. The motor vehicle latch according to claim 6, wherein the sealed rotary passage is equipped with a ring seal that is X-shaped in cross section.

8. The motor vehicle latch according to claim 5, wherein at least one of the drive housing and the electrical component carrier has a discharge opening for discharging water from the drive housing.

9. The motor vehicle latch according to claim 8, further comprising a trap for receiving water that is discharged through the discharge opening.

10. The motor vehicle latch according to claim 9, further comprising an air cushion to restrict water from penetrating into the drive housing.

11. The motor vehicle latch according to claim 1, wherein the latch case has an inlet mouth, and the seal is positioned whereby the inlet mouth is sealed off from the latch cover.

12. The motor vehicle latch according to claim 2, wherein the locking mechanism includes a catch and a pawl, and the pawl has an extension that extends through the seal.

13. The motor vehicle latch according to claim 4, wherein the electrical component carrier is coupled to the latch cover by an edge web and a fastening web.

14. A motor vehicle latch comprising:

a latch housing including a latch case and a latch cover, the latch case and the latch cover being connectable to one another to form the latch housing, and the latch case having a raised edge at least on part of a circumference of the latch case and the latch cover having an overhang flange, wherein:

when the latch cover is installed on the latch case to form the latch housing, the overhang flange of the latch cover overlaps the raised edge of the latch case;

the overhang flange and the raised edge define a slotted channel therebetween, the motor vehicle latch further comprising a seal that closes the slotted channel when the latch cover is installed on the latch case;

the seal is designed as a surface seal, and the motor vehicle latch further includes a locking mechanism mounted in the latch case that is sealed toward the latch cover by the seal, the seal, the latch case and the locking mechanism constitute a mechanical module, and the motor vehicle latch further includes an electrical module coupled to the latch cover, such that when the latch cover is installed on the latch case to form the latch housing, the latch housing encloses the mechanical and electrical modules, the electrical module has an electrical component carrier and at least one drive unit;

the drive unit is fixed to the electrical component carrier and is additionally covered with a drive housing, the electrical component carrier and the drive housing being connected to one another in a sealing manner via at least one circumferential plug-in channel; and at least one of the drive housing and the electrical component carrier has a discharge opening for discharging water from the drive housing.

15. The motor vehicle latch according to claim 14, further comprising a trap for receiving water that is discharged through the discharge opening.

16. The motor vehicle latch according to claim 15, further comprising an air cushion to restrict water from penetrating into the drive housing.

* * * * *